United States Patent
Huffman et al.

(10) Patent No.: US 6,874,920 B2
(45) Date of Patent: Apr. 5, 2005

(54) TOWING LIGHT FOR BOAT MOTOR

(75) Inventors: Scott Huffman, Mansfield, OH (US); Darryl Witwer, Amelia, VA (US)

(73) Assignee: Tow-Co., Inc., Mansfield, OH (US)

( * ) Notice: Subject to any disclaimer, the term of this patent is extended or adjusted under 35 U.S.C. 154(b) by 0 days.

(21) Appl. No.: 10/449,552

(22) Filed: May 30, 2003

(65) Prior Publication Data
US 2004/0004831 A1 Jan. 8, 2004

Related U.S. Application Data

(60) Provisional application No. 60/384,353, filed on May 30, 2002.

(51) Int. Cl.[7] ................................................. B60Q 1/00
(52) U.S. Cl. ...................... 362/477; 362/396; 362/486; 114/343; 340/984
(58) Field of Search ................................ 362/555, 549, 362/477, 485, 486, 396; 114/343; 340/984

(56) References Cited

U.S. PATENT DOCUMENTS

| | | | |
|---|---|---|---|
| 5,157,591 A | 10/1992 | Chudzik | |
| 5,613,886 A | 3/1997 | Cribbs | |
| 5,980,073 A | 11/1999 | Whipple | |
| 6,086,220 A | 7/2000 | Lash et al. | |
| 6,217,200 B1 | 4/2001 | Huffman | |
| 6,371,636 B1 * | 4/2002 | Wesson | 362/545 |
| 6,386,740 B1 * | 5/2002 | Grissom | 362/477 |

* cited by examiner

Primary Examiner—John Anthony Ward
(74) Attorney, Agent, or Firm—Timothy D. Bennett; Brouse McDowell

(57) ABSTRACT

A safety device includes a base section having arms extended from a first end. Securing straps are connected to the arms for holding the device in place. The base has a recess in one section of the base wherein a illuminating is placed. The illuminating includes Light Emitting Diodes that may be powered by a cable conducting electricity from an associated power source.

17 Claims, 5 Drawing Sheets

TOWING LIGHT FOR BOAT MOTOR

This application claims priority to U.S. Ser. No. 60/384,353, entitled TOWING LIGHT FOR BOAT MOTOR, filed May 30, 2002, which is incorporated herein by reference.

I. BACKGROUND OF THE INVENTION

A. Field of Invention

The present invention relates to the parts of safety lights, and more specifically safety lights for use in conjunction with towing boats.

B. Description of the Related Art

Currently in the art, it is known to incorporate safety lights on the rear of a boat trailer or boat for use in providing increased visibility of the vehicle. In certain cases, the safety lights are selectively attached to the boat motor during towing, and are removed prior to placing the boat in the water.

One invention, U.S. Pat. No. 5,980,073, discloses a boat trailer lighting system apparatus that includes a boat trailer for trailering a boat having an outboard motor mounted thereto. The patent further discloses an electrical light assembly having an electrical lamp therein that is rotatably attached to an outboard motor skeg mounting bracket, which is removably attached to the outboard motor skeg. The patent still further discloses that the outboard motor skeg mounting bracket has a cover sleeve of a general shape of the outboard motor skeg sliding over the skeg and a threaded clamping bolt threaded through the cover against the skeg to lock the skeg light to the outboard motor.

Another invention, U.S. Pat. No. 6,217,200, discloses a safety light apparatus that is provided for a trailer boat including an inboard or outboard propeller motor. The patent further discloses that the apparatus is designed to be detachably mountable on a hub of the propeller motor. The patent still further discloses that the apparatus preferably comprises a housing with a mounting recess, which is adapted to receive the hub, formed in a rear side thereof and a light assembly disposed on the front side of the housing.

What is needed is a safety light that securely fits about the cavitation plate of marine propulsion motor. A safely light is needed that fits more than one cavitation plate of different sizes. In this manner, any number of different sized motors can be fitted with a device that clearly shows the position of the tilted motor and cavitation plate.

II. SUMMARY OF THE INVENTION

Other objects and advantages of the invention will appear from the following detailed description of the preferred embodiment of the invention with reference being made to the accompanying drawings.

One aspect of the subject invention includes a head section that houses a series of Light Emitting Diodes for illuminating the motor and cavitation plate to which the safety device is affixed.

Another aspect of the present invention includes a base section having arms extended therefrom that receive an associated cavitation plate.

Yet another aspect of the present invention includes two portions of a securing strap fixed at respective ends of the device arms that prevent the device from coming off of the cavitation plate.

Still yet another aspect of the present invention includes the base section and arms being constructed from a closed cell material that is water tight.

The present invention includes base section that may be generally oblong having arms or fins extending from one side of the base section. In one embodiment, four arms may be included that grip the sides of an associated cavitation plate. The operator may install the device by positioning the arms over the cavitation plate. Straps may be fixed to the ends of the arms and secured together after installation of the device onto the cavitation plate thus holding the device in place.

The front of the base section may include an illuminating means, which may be LEDs, that are powered by a power cable connected to the power supply of an associated vehicle. The illuminating means may snuggly fit into a recess formed in the base section.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
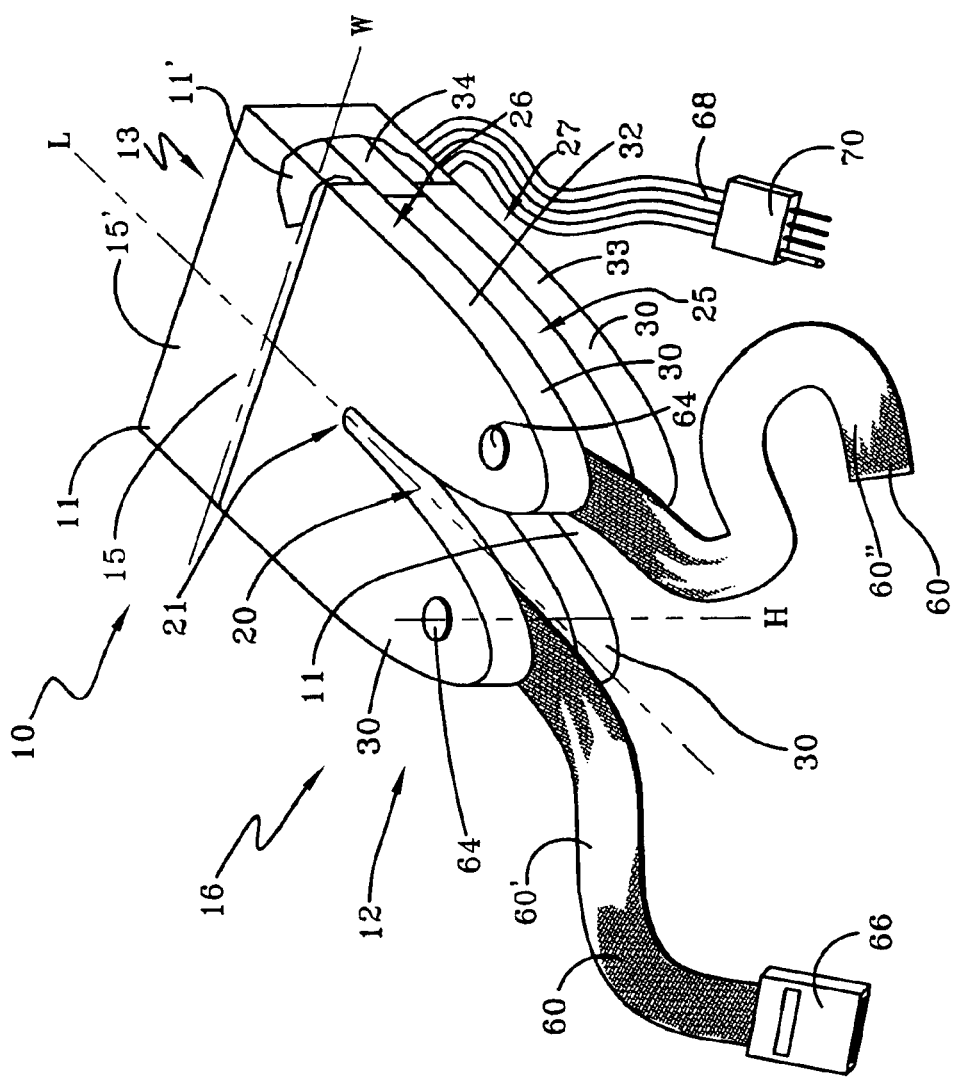
FIG. 1 is perspective rear view of the safety device.
Figure 3:
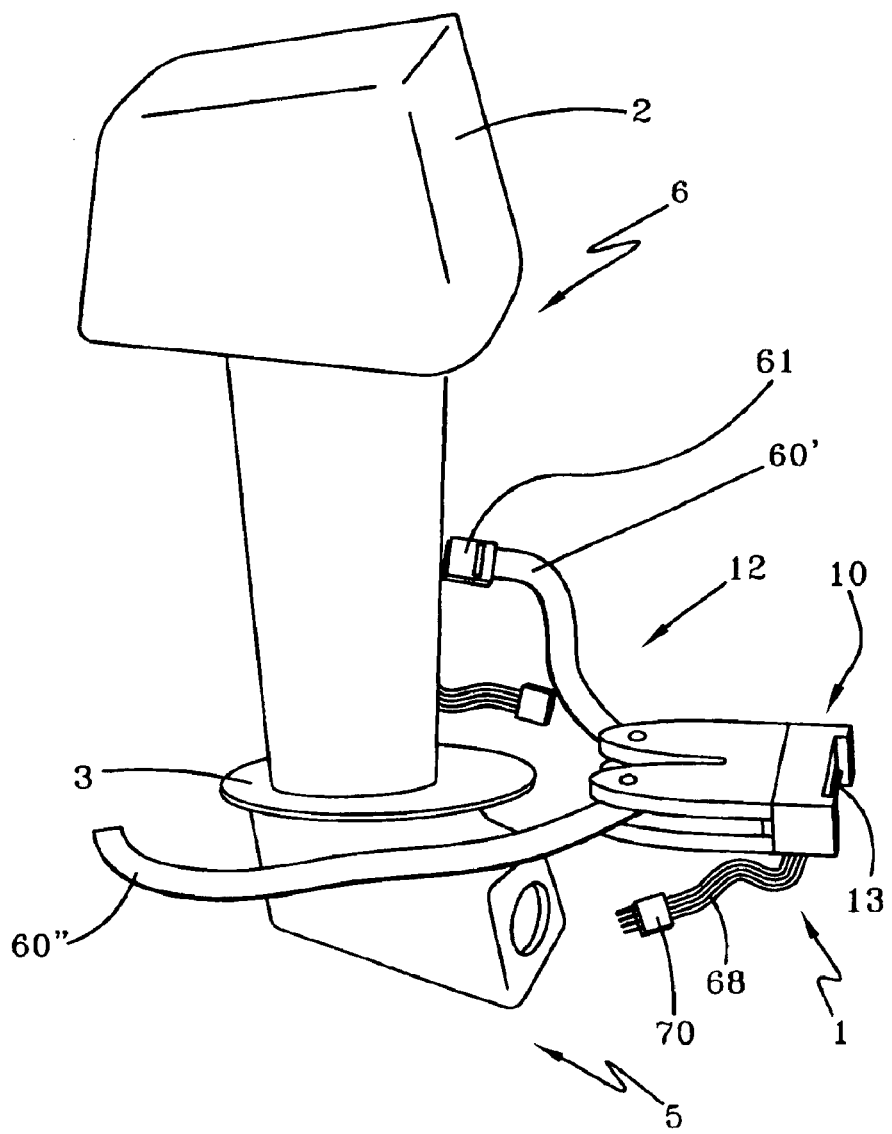
FIG. 3 is a perspective view of a marine motor and adjacently positioned safety device.

Referring now to the drawings, wherein the showings are for purposes of illustrating a preferred embodiment of the invention only and not for purposes of limiting the same, FIG. 1 depicts a safety lighting system, shown generally at 1, for selective installation onto the cavitation plate 3 of a marine vehicle motor 2, shown in FIG. 3. The safety lighting system 1 may be installed onto an inboard, outboard, inboard/outboard or any marine vehicle motor having a cavitation plate. The cavitation plate 3 may reside above the prop 5 and generally extends radially outward from the body 6 of the motor 2 in a planar fashion about a periphery of the body 6.

Figure 2:
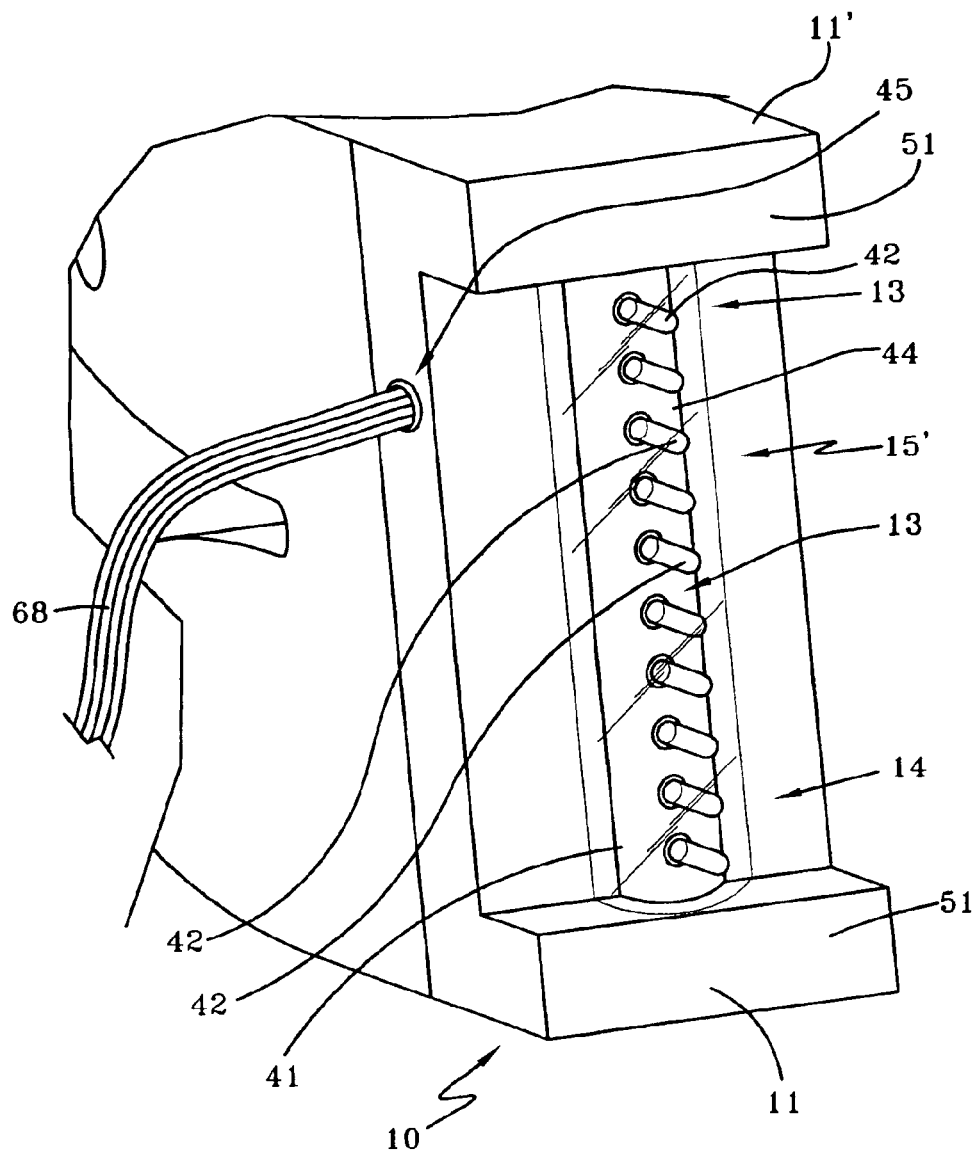
FIG. 2 is a partial perspective view of the front side of the safety device showing the LED illuminating light.

With reference to FIGS. 1 and 2, the safety lighting system 1 includes a base section 10. The base section 10 or body portion 10 has first and second ends 11, 11' and first and second sides 15, 15'. A cavity 14, shown in FIG. 2, is fashioned within the second side 15' of the body portion 10 for use in receiving a light emitting means 13 or illuminating means 13, which will be discussed further in a subsequent paragraph. A retaining means 16 is fixedly attached to the first side 15 of the body portion 10, or base section 10, for use in securing the device 1 onto the cavitation plate 3 of the motor 2, which will also be discussed further in a subsequent paragraph. In one embodiment, the body portion 10 is elongated, having a longitudinal axis L that extends from the base section 10 to the distal end of the retaining means 16. An axis W is defined as a transverse axis passing through the body portion 10, which is perpendicular to axis L. Additionally, axis H is defined as being perpendicular to both axis W and axis L, passing through the device 1. In this manner, the base section 10 has a length coincident with axis L, a width that is coincident with axis W and a height coincident with axis H.

With continued reference to FIGS. 1 and 2, looking at a top view, or down axis H of the safety lighting system 1, a recess 20 or slot 20 is shown fashioned within the retaining means extending longitudinally from a midpoint 21 of the safety lighting system 1 to the second end 12 thereof. The slot 20 extends through the entire height of the safety lighting system 1. The slot 20 is also symmetrical about the longitudinal axis L and may have a partial parabolic shape. However, any shape of slot 20 may be chosen with sound engineering judgment, as is appropriate for securing the safety lighting system 1 onto the cavitation plate 3 of the motor 2. Additionally, it is contemplated, in an alternate embodiment, that the slot may not be symmetrical about the longitudinal axis L. A second recess or slot 25 is fashioned through the width of the body portion 10. In a similar manner, the second recess 25 extends from the midpoint 21 of the body portion 10 to the second end 12 thereof along the axis L, as is clearly shown in the figures. In one embodiment, the second recess 25 is rectangular in shape. However, any configuration of recess may be chosen with sound engineering judgment. In this manner, a first slot 20 is fashioned in and extends from the topside 26 of the retaining means 16 to the bottom side 27 thereof in a first dimension and from a midpoint 21 to the second end 12 of the retaining means 16 in a second dimension. Similarly, the second recess 25 is fashioned in and extends from a first side of the retaining means 16 to a second side thereof in a third dimension and from the midpoint 21 to the second end of the retaining means 16 in the second dimension. In other words, two recesses 20, 25 are perpendicularly formed in the retaining means 16 of the safety lighting system 1. It is contemplated in an alternate embodiment, that any number of recesses may be formed in the retaining means 16 and with any spatial configuration, as is chosen with sound engineering judgment. In this manner, the recesses 20, 25 defined fins or arms 30, which are received around the cavitation plate 3 of the motor 2 during installation of the safety lighting system 1. In the preferred embodiment, the fins or arms 30, at the second end 12 of the body portion 10, may be chamfered or tapered.

With reference again to FIGS. 1 and 2, construction of the safety lighting system 1 will now be discussed. In one embodiment, the safety lighting system 1 may be formed from multiple planar layers of Polyethylene. It is noted, at this point, that the material used in forming the body portion layers may be of the closed cell type. Consequently, the safety lighting system 1 may not become saturated with liquid and, as a result, floats. It is also noted, at this point, that any material may be chosen with sound engineering judgment, as is appropriate for forming the safety lighting system 1. The safety lighting system 1 includes a top piece 32 and a bottom piece 33. Additionally, a centerpiece 34 is disposed between the top piece 32 and bottom piece 33. During construction, the first slot 20 is formed in each of the respective top and bottom pieces 32, 33. It is noted that any manner of forming the slot 20 in the body portion 10 may be chosen with sound engineering judgment, including die cutting. As the body portion 10 is assembled, the centerpiece 34 is disposed between the top and bottom pieces 32, 33; wherein, each of the respective pieces 32, 33, 34, are affixed together by an adhesive appropriately chosen for use with the selected material from which the pieces are made. However, any means of fixedly securing the pieces 32, 33, 34 together may be chosen with sound engineering judgment. It is also noted, at this point, that the safety lighting system 1 may be constructed of additional layers or pieces in greater quantities than those described herein. In other words, any or all of the pieces 32, 33 and 34 may be constructed from multiple layers. In this manner, the safety lighting system 1 includes a top portion 32, a bottom portion 33 and a center portion 34. The center portion 34 is characterized by being substantially shorter in length, that is along the longitudinal axis L, than the remaining top and bottom portions 32, 33. That is to say that the center portion 34 may not have a first slot 20 fashioned therein. Consequently, due to the shortened length of the center portion 34, the second slot 25 may be formed in the safety lighting system 1 merely by assembling the portions 32, 33 and 34 together.

The safety lighting system 1, constructed from the top, center and bottom portions respectively, may be coated with a vinyl coating, to enhance the aesthetic appearance of the safety lighting system 1. The vinyl coating may be of any color or texture such as is chosen with sound engineering judgment. Additionally, the vinyl coatings may be applied to hide the seams formed by the interface of the top, center and bottom portions respectively. It is noted, at this point, that any coating may be used with sound engineering judgment that is appropriate for use with the material from which the safety lighting system 1 is constructed.

With reference again to FIG. 1 and now specifically to FIG. 2, the light emitting means 13 or illuminating means will now be discussed. The base section 10 is generally oblong and may receive a light-emitting housing member 41. In one embodiment, the light-emitting member 41 is a series of LEDs, or Light Emitting Diodes, 42 held together by a bracket member 44. The LEDs 42 may be aligned in a linear manner from the first end 11 to the second end 11' of the base section 10. However, any configuration of LEDs may be chosen with sound engineering judgment. The housing member 41 may be a hollow, extruded member cut to an appropriate length for use in inserting the LEDs 42 and bracket 44 therein. In one embodiment, a groove, not shown, may be formed in the base section 10 for use in receiving the light-emitting housing member 41. A hole 45 may also be fashioned in the base section 10, wherein electrical conductors may pass through for use in operatively connecting power to the LEDs 42. In this manner, the LEDs 42 may be inserted into the light-emitting housing member 41 and subsequently the housing member 41 may be inserted into the groove of the base section 10. Additionally, electrical conductors, which operatively connect power to the LEDs 42 may be inserted through the hole 45 fashioned in the base section 10. In one embodiment, the cavity 14 is formed by cutting a configuration into the center portion 44 and by assembling the top, center and bottom portions respectively. In that the base section 10 is manufactured from a flexible material, the base section 10 may be selectively deformed, to allow for insertion of the light emitting means 13 into the cavity 14 and groove. It is noted, at this point that the base section 10 may include retaining walls 51 that serve to retain the light admitting means 13 within the base section 10. Additionally, it is noted that, since the light admitting means 13 is not fixedly received into cavity 14, the light emitting means 13 may be rotated about a longitudinal axis for use in selectively adjusting the angle at which the light emitting means 13 emits the light.

With continued reference to FIGS. 1 and 2, an electrical connector 70 is shown operatively attached to the electrical conductors 68 of the light emitting means 13. In one embodiment, the electrical conductors 68 are positioned next to each other and form a single conductive member or cable. However, any means of electrically communicating power from a power source to the light emitting means 13 may be chosen with sound engineering judgment. The electrical connector 70 may include male portions and female portions. Accordingly, a matching electrical connector, not shown, may be used to receive electrical connector 70 for use in correctly operatively communicating power from a power source to the light emitting means 13. In other words, the "common" electrical conductor, coming from the light emitting means 13, may be operatively connected to the male portion of the electrical connector 70 and the "hot" the electrical conductor may be operatively connected to the female portion of the electrical connector 70. Respectively, the "common" electrical conductor from the power supply may be operatively connected to the female portion of the matching electrical connector and, consequently, the "hot" electrical conductor from the power supply may be operatively connected to the male portion of the matching electrical connector. In other words, the respective electrical conductors from the light emitting means 13 and from the power supply may be connected to the opposing male/female matching members of the respective electrical connectors to ensure proper connection of the conductors.

With reference again to FIGS. 1 and 2, the securing means will now be discussed. In one embodiment, the securing means may include strap members 60 having first and second ends. The first ends of the strap member 60 are fixedly secured to the safety lighting system 1. In one embodiment, there are at least two fins or arms 30 and accordingly there are two strap sections 60', 60" each of which is attached one to each of two arms 30. The strap member 60 may be attached to the arms 30 at their respective ends by way of well nuts 64, shown in FIG. 1. The well nuts 64 may inserted into holes fashioned in the ends of the arms 30. The strap section 60', 60" may also receive the well nuts 64 and be fixedly held in place to the arms 30. However, any means of fixedly attaching the strap member 60 to the arms 30 may be chosen with sound engineering judgment. The second end of the strap section 60' may have attached thereon a connector member 66. The connector member 66 may be of any type chosen with sound engineering judgment, so as to secure the strap sections 60', 60" to each other, as is clearly depicted in the Figures. The strap member 60 may be of sufficient length to secure the safety lighting system 1 to one of a plurality of substantially different size plates.

With reference now to all of the Figures, a description of the operation of the present invention will now be discussed. In one embodiment, the operator of the present invention may insert the safety lighting system 1 at the second end 12 on to the cavitation plates 3 of a motor 2. In this manner, the arms 30 of the safety lighting system 1 are received both above and below the cavitation plates on both of the left and right sides of the body 6 of the motor 2. Subsequently, the operator would grasp the strap sections 60', 60" and position them about the rear portion of the motor 2, where the operator would fasten the corresponding connector member 66 of the strap members 60, thereby securely fastening the safety light assembly 1 onto the motor 2. It may be necessary to adjust the length of the strap member 60, so as to correspond with the size of the motor 2 onto which the safety light assembly 1 is being attached. Then, the operator would operatively connect the electrical connector 70 into the corresponding electrical connector from the power supply. It is noted at this point that the safety lighting system may function in unison with the brake lighting system of the vehicle. In other words, the system 1 may function as a brake light for the subject vehicle.

It is noted, at this point, that the electrical connector from the power supply may be a second electrical conductor assembly that has been electrically communicated to the brake lighting system of the vehicle or trailer, which is carrying the motor 2. The second electrical conductor assembly has first and second ends. The first end of the second electrical conductor assembly is operatively attached to the electrical connector that mates with electrical connector 70. The second end of the second electrical conductor assembly may have crimping members. The crimping members may be operatively connected to the brake lighting system by inserting the crimping members over existing electrical conductors and, subsequently, crimped in a manner so as to electrically communicate to the conductors of the brake lighting system. Therefore, in this manner, the light emitting means 13 may emit light in synchronization with the brake lighting system of the vehicle or trailer.

Figure 4:
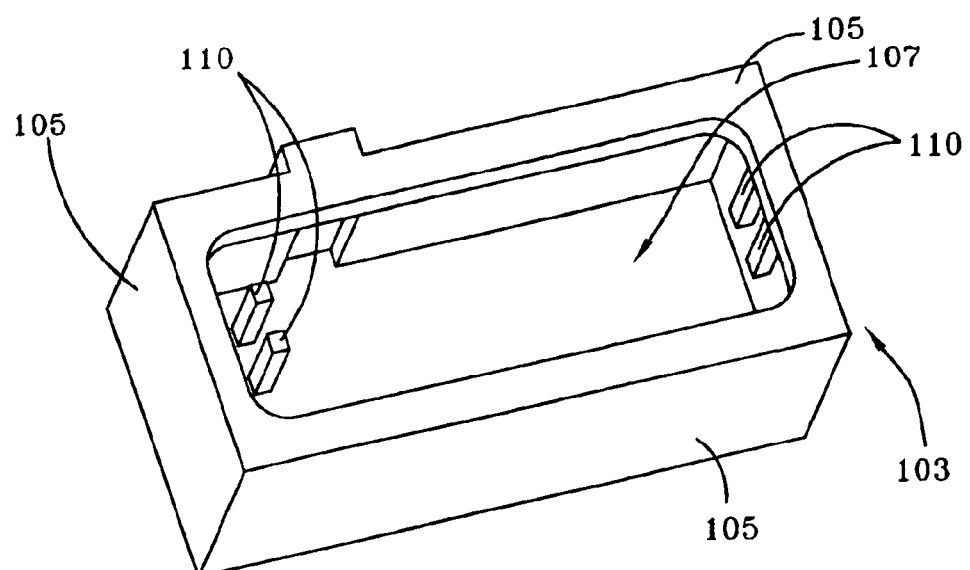
FIG. 4 is a partial cutaway perspective view of an alternate embodiment of the safety device.
Figure 4A:
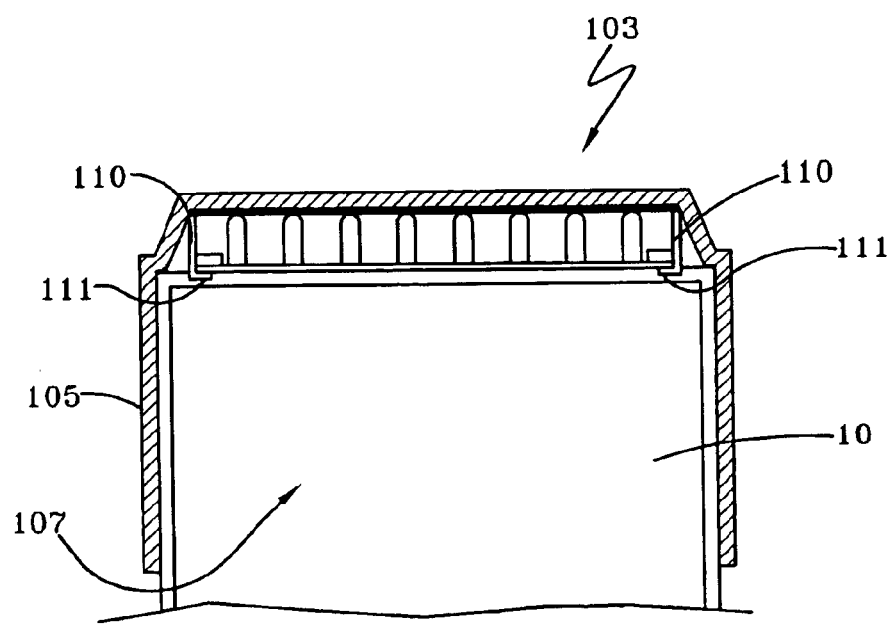
FIG. 4a is a side cross-sectional view of an alternate embodiment of the safety device.

With reference to FIGS. 4 and 4a, an alternate embodiment of the present invention will now be discussed. In the previous embodiment, the base portion 10 may have a recess formed in the base portion for receiving the illuminating means 13. In this embodiment, a body cap member is included shown generally at 103. The body cap member 103 may be oblong in a manner as similar to the body portion 10. The body cap member 103 may have a generally concave configuration wherein a cavity 107 formed by walls 105 of the body cap member 103 may receive the second side 15' of the body portion 10. In other words, the body cap portion 103 may have a shape that proportionately matches the body portion 10 and the body cap portion 103 may fit over the second end 15' of the body portion 10. The body cap portion 103 may have any configuration chosen with sound engineering judgment so as to allow the body cap portion 103 to fit over body portion 10. The body cap portion 103 may have a snug fit with respect to the body portion 10. However any amount of clearance between the body portion 10 and body cap portion 103 may be chosen with sound engineering judgment. In this way, during construction of the device 1, after the body portion has been assembled, the body cap portion 103 may be inserted onto the second end of the 15' of the body portion 10 and secured thereto in a manner to be described in a subsequent paragraph.

With continued reference to FIGS. 4 and 4a, body cap portion 103 may be constructed from a plastic material. The plastic material may be transparent or translucent and may be any plastic material chosen with sound engineering judgment. In one embodiment, the plastic material may be resistant to cracking or breaking. However, any material, plastic or otherwise, may be chosen with sound engineering judgment for use in constructing the body cap portion 103. The body cap portion 103 may also include clips 110 that function to receive the illuminating means 13. The clips 110 may be resiliently deformable extensions extending from the side of the walls 105 that can be slightly expanded without breaking to snap the illuminating means 13 in place in a manner well known in the art. It is noted that the clips 110 may be integrally formed with the body cap portion 103. One method of constructing the body cap portion 103 may include thermo-plastic molding wherein a mold may be constructed to include the clip extensions. In that the thermoplastic forming of components is well known in the art, no further explanation will be offered at this time. Any manner of forming extensions or clips 110 may be chosen with sound engineering judgment. The clips 110 may have a lip 111 to hold the illuminating means 13 after the illuminating means 13 has been has been inserted into the clips 110. In this manner, the illuminating means 13 may be received by the body cap portion 103. Subsequently, the body cap portion 103 with the illuminating means 13 may be inserted onto the body portion 10 in a manner consistent with the aforementioned description. After the body cap portion 103 is inserted onto the body portion 10, the body cap portion 103 may be affixed to the body portion via adhesives, applied prior to installation, fasteners or any other fastening means chosen with sound engineering judgment. It is should be noted that the electrical conductors 68 may be fed through an aperture formed in the body cap portion 103.

This is contrasted with another embodiment, described above, where the conductors 68 are fed through the body portion 10 itself. However, any manner of routing the conductors 68 may be chosen with sound engineering judgment as is appropriate for use with the device 1.

With continued reference to FIGS. 4 and 4*a*, the manner of constructing the device according to the subject embodiment will now be discussed. The operator may take a body cap portion 103 and an illuminating means 13. The operator may then insert the conductors 68 through an aperture formed in the cap 103. The operator may also snap the illuminating means 13 into the clips 110 of the cap 103. Subsequently, the operator may apply an adhesive to the body portion 10 and/or the wall surfaces of the cap 103. The operator may then insert the cap 103 onto the body portion 10 allowing the adhesive to cure thereby holding the cap 103 place.

Figure 5:
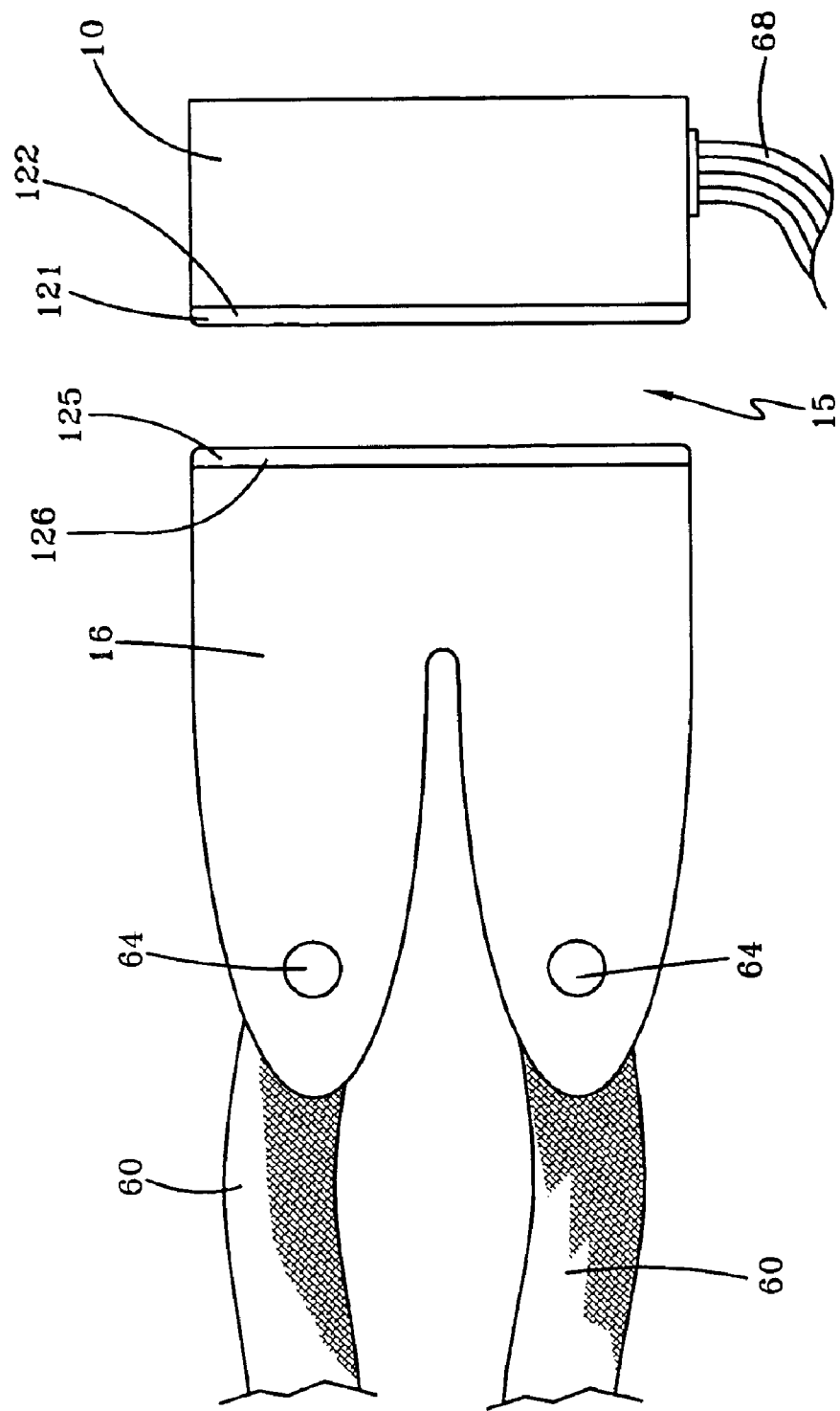
FIG. 5 is a top view of an alternate embodiment of the safety device.

With reference now to FIG. 5, a top view of the device 1 is shown. Another embodiment of the subject invention will now be discussed. FIG. 5 shows the device 1 with body portion 10 separate from the retaining means 16. The first side 15 of the body portion 10 may have a connecting member 121 extended from the first side 15 of the body portion 10. The connecting member 121 may be a separate item that is affixed to the body portion 10 in any manner shown chosen with sound engineering judgment. In one embodiment, the connecting member 121 may be a magnetic connecting member 122. The body portion 10 may still have any of the configurations as described in the various embodiments listed above. The retaining means 16 may respectively have a matching connecting member 125 that is extended or fixedly attached to an end of the retaining means 16 in a similar manner. In this way, the matching connecting member 125 may be a correctly polarized magnetic member 126 chosen to attract the magnetic connecting member 122. The relative strength of the connecting member 122, 126 may be chosen such that the body portion is held in place during use and such that the operator may selectively remove the body portion 10 as desired. It should be noted that the use of magnetically attractive members may be replaced by any selectively attachable/detachable means for securing the body portion 10 to the retaining means 16 without departing from the intended function of the subject embodiment.

While specific embodiments of the invention have been described and illustrated, it is to be understood that these embodiments are provided by way of example only and that the invention is not to be construed as being limited thereto, but only by proper scope of the following claims.

We claim:

1. A safety device for attachment to one of a plurality of substantially different sized associated cavitation plates, comprising:
   a base section;
   at least first, second, third and fourth arms extending from the base section, the at least first, second, third and fourth arms adapted to receive one of the plurality of substantially different sized associated cavitation plates both above and below the cavitation plate;
   securing means for use in securing the device to the one of the plurality of substantially different size associated cavitation plates; and,
   illuminating means for use in illuminating the device.

2. The device of claim 1, further comprising:
   power connection cable for use in communicating power from an associated power supply to the illuminating means.

3. The device of claim 1, wherein the illuminating means includes at least a first LED.

4. The device of claim 1, wherein the at least first, second, third and fourth arms are formed of a flexible material for use in receiving one of the plurality of substantially different size associated cavitation plates.

5. The device of claim 4, wherein the device floats.

6. The device claim 1, wherein the illuminating means is embedded into the base section.

7. The device of claim 1, wherein the securing means comprises a strap member that is attached to the first and second arms respectively.

8. A safety device for attachment to one of a plurality of substantially different sized associated cavitation plates, comprising:
   a base section:
   at least first and second arms extended from the base section, the at least first and second arms adapted to receive one of the plurality of substantially different sized associated cavitation plates:
   securing means for use in securing the device to the one of the plurality of substantially different size associated cavitation plates:
   illuminating means for use in illuminating the device; and,
   wherein the base section is selectively attachable and detachable to the at least first and second arms.

9. The device of claim 8, further comprising:
   a first connecting member extending from the base section;
   a second connecting member extending from the at least first and second arms; and,
   wherein the first connecting member is selectively magnetically connected to the second connecting member.

10. The device of claim 9, wherein the illuminating means includes at least a first LED.

11. The device of claim 9, wherein the at least first and second arms are formed of a flexible material for use in receiving one of the plurality of substantially different sized associated cavitation plates.

12. The device of claim 9, wherein the device floats.

13. A safety device for attachment to one of a plurality of substantially different sized associated cavitation plates, comprising:
   a base section;
   at least first and second arms extended from the base section, the at least first and second arms adapted to receive one of the plurality of substantially different sized associated cavitation plates;
   securing means for use in securing the device to the one of the plurality of substantially different size associated cavitation plates;
   illuminating means for use in illuminating the device; and,
   wherein the device floats.

14. The device of claim 13, wherein the illuminating means includes at least a first LED.

15. The device of claim 13, wherein the at least first and second arms are formed of a flexible material for use in receiving one of the plurality of substantially different sized associated cavitation plates.

16. The device of claim 13, wherein the illuminating means is embedded into the base section.

17. The device of claim 13, wherein the securing means comprises a strap member that is attached to the first and second arms respectively.

* * * * *